United States Patent
Shinriki et al.

(10) Patent No.: US 7,292,739 B2
(45) Date of Patent: Nov. 6, 2007

(54) OPTICAL MODULATOR

(75) Inventors: Takashi Shinriki, Tokyo (JP); Toshihiro Sakamoto, Tokyo (JP); Masanao Kurihara, Tokyo (JP); Toru Sugamata, Tokyo (JP); Norikazu Miyazaki, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 10/527,214

(22) PCT Filed: Sep. 10, 2003

(86) PCT No.: PCT/JP03/11546

§ 371 (c)(1),
(2), (4) Date: Oct. 5, 2005

(87) PCT Pub. No.: WO2004/025358

PCT Pub. Date: Mar. 25, 2004

(65) Prior Publication Data

US 2006/0147145 A1    Jul. 6, 2006

(30) Foreign Application Priority Data

Sep. 12, 2002   (JP) .............................. 2002-267279
Mar. 26, 2003   (JP) .............................. 2003-086249

(51) Int. Cl.
*G02F 1/035* (2006.01)
(52) U.S. Cl. ........................................... 385/3; 385/40
(58) Field of Classification Search ............... 385/1–5, 385/8, 39, 40
See application file for complete search history.

(56) References Cited

U.S. PATENT DOCUMENTS 6,801,675 B2 * 10/2004 Doi et al. ..................... 385/3
2002/0146190 A1 * 10/2002 Doi et al. ..................... 385/14

FOREIGN PATENT DOCUMENTS

| JP | 63-313120 | 12/1988 |
| JP | 06-067130 | 3/1994 |
| JP | 07-234391 | 9/1995 |
| JP | 09-297289 | 11/1997 |
| JP | 10-090638 | 4/1998 |

* cited by examiner

*Primary Examiner*—Sarah Song
(74) *Attorney, Agent, or Firm*—Chapman and Cutler LLP

(57) ABSTRACT

An optical modulator in which stabilized driving is realized over a long time by relaxing stress generated in a recess formed in the surface of a substrate in the optical modulator and controlling deterioration of optical modulation control caused by stress-strain in the substrate including an optical waveguide. The optical modulator comprises a substrate of a material exhibiting electrooptic effect, an optical waveguide (4) provided on the substrate, and control electrodes (20-25) for controlling the phase of light being guided through the optical waveguide characterized in that a recess (12) is provided in the surface of the substrate for forming the control electrodes, and the control electrode (24) being formed on the recess is provided with a stress relaxing means.

20 Claims, 3 Drawing Sheets

OPTICAL MODULATOR

BACKGROUND OF THE INVENTION

1. Field of the Invention

The present invention relates to an optical modulator which is used for a light control element such as modulation of a light wave and switching of an optical path, in particular, to an optical modulator which comprises a recess in a substrate forming the optical modulator, and a control electrode formed on said recess for controlling the phase of light.

2. Related Art Statement

Optical communication systems have attracted attention corresponding to an increase in the demand for high speed, large capacity data communication systems recently. Particularly, the optical modulator where an optical waveguide is formed in the substrate using a material having an electrooptic effect is widely known as a light control element suitable for optical broadband communication systems.

Also, as an optical modulator, which corresponds to a dense wavelength division multiplexing (DWDM) technology and high speed communication technology, the optical modulator which modulates a light from CW (Continuous Wave) laser using a Mach-Zehnder Interferometer (MZI) type external optical modulator (hereinafter described as LN optical modulator) using a material having the electrooptic effect, such as lithium niobate (LN), have been put to practical use.

As shown in FIG. 1, the MZI type external optical modulator is configured to divide a light inputted from an input optical waveguide 2 in half with a Y-shaped branching optical waveguide 3, to combine the lights guided through two optical waveguide 4 (the optical waveguides, wherein a light guided inside receives a phase control by the electrooptic effect of an electric field formed by a modulating electrode and a grounding electrode, which are control electrodes; hereinafter described as an optical waveguide modulation part) with another Y-shaped branching optical waveguide 5, and to put the modulated light to the exterior via an output optical waveguide 6. Each of these optical waveguides is formed by thermal diffusion of a high refractive index material such as Ti, on the surface of a substrate 1 having the electrooptic effect. In FIG. 1, the control electrodes such as the modulating electrode and the grounding electrode formed on the substrate 1 are omitted in order to make the shape of the optical waveguides easily understood.

In recent years, for the optical modulator having such optical waveguides, Japanese Patent Application No. H10-90638, for example, discloses an optical waveguide with ridge structure. In order to perform effective electric field effect of the control electrodes (a modulating electrode 21, and grounding electrodes 20 and 22) on the optical waveguide 4, this proposes a configuration as shown in FIG. 2 for providing ridges by forming recesses 10, 11 and 12 on both sides of the optical waveguide 4 and thereby allowing the electric field formed by the control electrodes to work intensively on the optical waveguide.

FIG. 2 is a cross-section view of the MZI type optical modulator shown in FIG. 1 along the dashed line A in a direction perpendicular to the optical waveguide modulation part 4. 7 in FIG. 2 indicates a buffer layer formed from $SiO_2$ or the like.

However, in the optical modulator shown in FIG. 2, the grounding electrode 22 is formed over the recess 12. Thus, the temperature mainly around the control electrode section like the grounding electrode rises due to driving of the optical modulator over a long time and an increasing driving power that is inputted into the optical modulator. The difference in a coefficient of thermal expansion between the substrate forming the recess 12 and the grounding electrode formed on the recess 12 concentrates stress by the grounding electrode centrally in the side of the recess. Said stress generates stress-strain in the substrate. Since such stress-strain changes the refractive index of the substrate including the optical waveguide, it becomes a big obstacle in stably controlling the phase of light passing through the optical waveguide in the optical modulator.

Additionally, besides the above-described MZI type optical modulator, such stress-strain due to concentration of stress is also generated when a recess is formed in the surface of a substrate which forms an optical modulator and an electrode such as a grounding electrode is formed over said recess. Especially when an optical waveguide is formed adjacent to the recess, the influence of the stress-strain on optical modulation control becomes prominent.

The present invention intends to solve the above-described problems, to relax the stress generated in the recess formed in the surface of the substrate in the optical modulator, to inhibit deterioration of optical modulation control caused by the stress-strain in the substrate including the optical waveguide, and to provide the optical modulator which realizes stabilized driving over a long time.

SUMMARY OF THE INVENTION

In order to solve the above described problems, the invention in one preferred embodiment provides an optical modulator comprising a substrate consisting of a material having an electrooptic effect, an optical waveguide provided on said substrate, control electrodes for controlling the phase of light being guided through the optical waveguide, and a recess in the surface of the substrate where the control electrodes are formed, characterized in that the control electrode being formed on said recess is provided with a stress relaxing means.

In accordance with the invention in this first embodiment, even when the difference in a coefficient of thermal expansion between the control electrodes and the substrate generates stress between the control electrodes and the substrate, it is possible to control the stress concentrating in the side of the recess in particular, and prevent destabilization of optical modulation control due to stress-strain because the stress relaxing means is provided for the control electrode formed on the recess.

In addition, in a second aspect of the invention the optical modulator is characterized in that the stress relaxing means configured said control electrode on the recess thinner than the control electrodes on the non-recess.

Further, in another, third aspect of the invention, it is characterized in that the stress relaxing means configures the control electrode on the recess thinner than the depth of the recess.

In accordance with a further aspect of the invention, because the control electrode on the recess is configured to be thinner than the control electrodes on the non-recess, it is possible to keep the stress of thermal expansion generated in the control electrode on the recess lower than the stress generated in the control electrodes on the non-recess. Further, because the mechanical strength of the control electrode on the recess is weaker than that of the control electrodes on the non-recess, the stress-strain generated by the control electrodes as a whole can be absorbed by the mechanical deformation of the control electrode on the recess. Then, transmission of the stress from the control electrodes to the surface of the substrate is relaxed. Especially the stress can be prevented from concentrating in the side of the recess.

In accordance with another aspect of the invention, by configuring the control electrode on the recess thinner than the depth of the recess, it becomes possible to localize and lessen the stress that the control electrode on the recess gives on the side of the recess. Moreover, because the control electrode on the recess is weaker than the substrate forming the side of the recess in mechanical strength, the stress on the side of the recess can be further inhibited.

In addition, in another aspect of the invention, the optical modulator is characterized in that the thickness of the control electrode on the recess is 30000 to 500 Å.

In accordance with a further aspect of the invention, by configuring the control electrode thinner than 30000 Å, preferably thinner than 20000 Å, it is adequately thin even compared with a control electrode 20 μm thick and a ridge part about 4 to 10 μm deep, which are applied for an average optical modulator. Therefore, the stress that the control electrode on the recess gives on the recess can be inhibited sufficiently.

Also, by configuring the control electrode on the recess thicker than 100 Å, preferably thicker than 500 Å, it is possible to ensure the thickness thicker than the film thickness of a conducting line which can be stably produced, in deposition applied for the production process of an optical modulator.

In addition, according to another aspect of the invention, the optical modulator is characterized in that the stress relaxing means creates a space between the substrate surface where the recess is formed and the control electrode on the recess.

In accordance with another aspect of the invention, the space is created between the substrate surface where the recess is formed and the control electrode on the recess, to keep the substrate surface and the control electrode out of contact with each other. Therefore the stress of the control electrode is prevented from being given on the substrate surface on the recess, especially on the side of the recess.

Further, it is preferable to configure the control electrode on the substrate surface providing the recess thinner than the control electrodes on the substrate surface the non-recess. It is more preferable to configure it 1 to 10 μm in thickness.

In addition, in another aspect of the invention the optical modulator is characterized in that the stress relaxing means forms the control electrode on the recess in the shape of a stripe or a lattice.

In accordance with another aspect of the invention, because the control electrode on the recess is in the shape of a stripe or a lattice, even when the control electrode on the recess thermal-expands, it expands to spaces formed by the shape of a stripe or a lattice. It is thereby possible to inhibit stress concentrating in the side of the recess. Moreover, since the part in the shape of a stripe or lattice has weaker mechanical strength than the other control electrodes, the stress-strain generated by the control electrodes as a whole can be absorbed by the mechanical deformation of the control electrode on the recess. This relaxes transmission of the stress from the control electrodes to the substrate surface. Further, by combining it with any configuration previously disclosed, it is possible to inhibit concentration of stress in the side of the recess more effectively.

In addition, in another aspect of the invention the optical modulator is characterized in that the stress relaxing means configures the control electrode on the recess to be a thin line for connecting the control electrodes formed on the non-recess next to said recess.

In accordance with another aspect of the invention, because the thin line connects the control electrodes formed on non-recess next to the recess, the thin line, which is the control electrode on the recess, scarcely generates stress that could influence the optical modulator. Furthermore, because transmission of the stress generated in the control electrodes formed on the non-recess is blocked at the recess, the side of the recess is prevented from receiving the stress.

In addition, in another aspect of the invention the optical modulator is characterized in that the substrate comprises the direction of a crystal axis which can change a refractive index in a vertical direction to the substrate surface in the most effective manner by the electrooptic effect.

When the optical modulator comprises the substrate (hereinafter described as Z cut substrate) having the direction of a crystal axis which can change the refractive index in the vertical direction to the substrate surface in the most effective manner by the electrooptic effect, grooves are sometimes formed on both sides of the optical waveguide such that the grooves sandwich the optical waveguide, for the purpose of performing electrooptic effect of an electric field on the optical waveguide effectively since it is necessary to impress the electric field in the vertical direction to the substrate surface. In accordance with the invention as described in the preceding paragraph, by applying the technology for providing the stress relaxing means for the control electrode formed on the recess, which is disclosed previously, to such optical modulator having the Z cut substrate, it becomes possible to provide the optical modulator with superior characteristics (stability of bias point).

In addition, in another aspect of the invention the optical modulator is characterized in that said control electrode with said stress relaxing means is a grounding electrode.

Because the construction for providing the control electrode formed on the recess with the stress relaxing means as described above has a discontinuous change in impedance or shape of the control electrode before or after the stress relaxing means, a high-frequency microwave is given to being reflected or radiated to the exterior of the control electrode when it is propagated. Therefore, the characteristics of the optical modulator possibly deteriorate when the control electrode is made as a modulating electrode. Thus, by making the control electrode providing the stress relaxing means as the grounding electrode, as previously described, it becomes possible to provide the optical modulator with superior characteristics.

DETAILED DESCRIPTION OF THE INVENTION

In the following, the preferred embodiments of the present invention are explained in detail.

The substrate which configures an optical modulator is made of a material having an electrooptic effect, such as lithium niobate (LiNbO$_3$; hereinafter referred to as LN), lithium tantalite (LiTaO$_3$), PLZT (lead lanthanum zirconate titanate) or quartz-based material. In particular, it is preferable to use an LiNbO$_3$ crystal, an LiTaO$_3$ crystal, or a solid solution crystal made of LiNbO$_3$ and LiTaO$_3$ due to the fact that an optical waveguide device can be easily formed of any of these crystals which have a large electrooptic constant. The present invention embodiments primarily refer to an example using lithium niobate (LN).

Also, the present invention, being explained by the example using a substrate, so-called a Z cut substrate, having the direction of crystal axis which can change a refractive index in a vertical direction to the substrate surface in the most effective manner by the electrooptic effect, is not limited to the Z cut substrate.

A method for forming an optical waveguide by thermal diffusion of Ti in an LN substrate, and subsequently forming an electrode directly on the LN substrate without providing a buffer layer over a portion or the entirety of the substrate, and a method for providing a buffer layer, such as SiO$_2$, which is dielectric, on an LN substrate in order to reduce the propagation loss of light in the optical waveguide, and forming a modulating electrode and a grounding electrode having thickness of several tens of μm on top of the buffer layer according to the formation of a Ti.Au electrode pattern, and according to a gold plating method or the like, are cited as methods for manufacturing an optical modulator.

In general, a plurality of optical modulators are fabricated on one LN wafer, which is cut into individual optical modulators at the last stage and thereby, optical modulators are manufactured.

Figure 1:
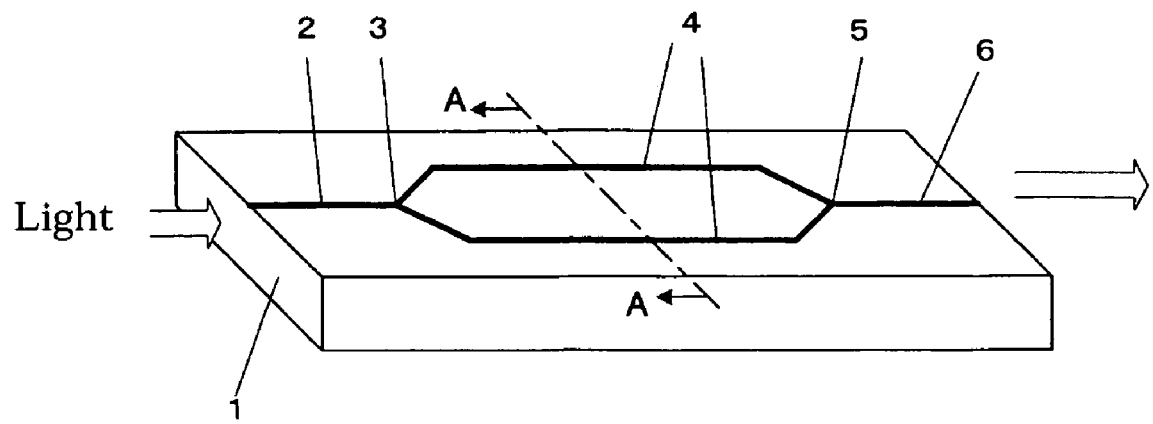
FIG. 1 is a diagram showing a MZI type optical modulator.

A MZI type optical modulator as shown in FIG. 1 is explained as the embodiment of the present invention.

1 is an LN substrate forming the optical waveguide on its surface by internal diffusion of Ti as above described. 2 is an input optical waveguide, where a light is guided from a CW laser light source that is not shown in the figure, and which is connected to a fiber (not shown in the figure) having a polarization maintain feature.

The light passing through the input optical waveguide 2 is divided in half by a 3 dB branching optical waveguide 3, which is a first branching optical waveguide. Each divided light enters an optical waveguide modulation part 4 configuring the arms of the Mach-Zehnder Interferometer optical waveguide.

Control electrodes comprising a modulating electrode and a grounding electrode, which are not shown in the figure, are formed adjacent to the optical waveguide modulation part 4. The light passing through the optical waveguide modulation part 4 in accordance with a signal impressed into the modulating electrode receives phase modulation. After the phase modulation, each guided light is combined and mutually interferes to generate an intensely modulated signal light at a second branching optical waveguide 5.

The signal light passes through an output optical waveguide 6, and then, is outputted from the optical modulator module through an output fiber which is not shown in the picture.

In addition, grooves (not shown in the figure) are formed adjacent to the optical waveguide modulation part 4 such that the grooves sandwich the optical waveguide modulation part 4. It is configured such that the electric field generated by the modulating electrode and the grounding electrode formed on the optical waveguide modulation part 4 works on the optical waveguide modulation part 4 intensively. The grooves are formed by erosion.cutting of the substrate by etching or sandblast etc. before forming the buffer layer such as SiO$_3$.

Subsequently, stress relaxing means, which is characteristic of the present invention, provided for the control electrode on a recess is explained.

Figure 3:
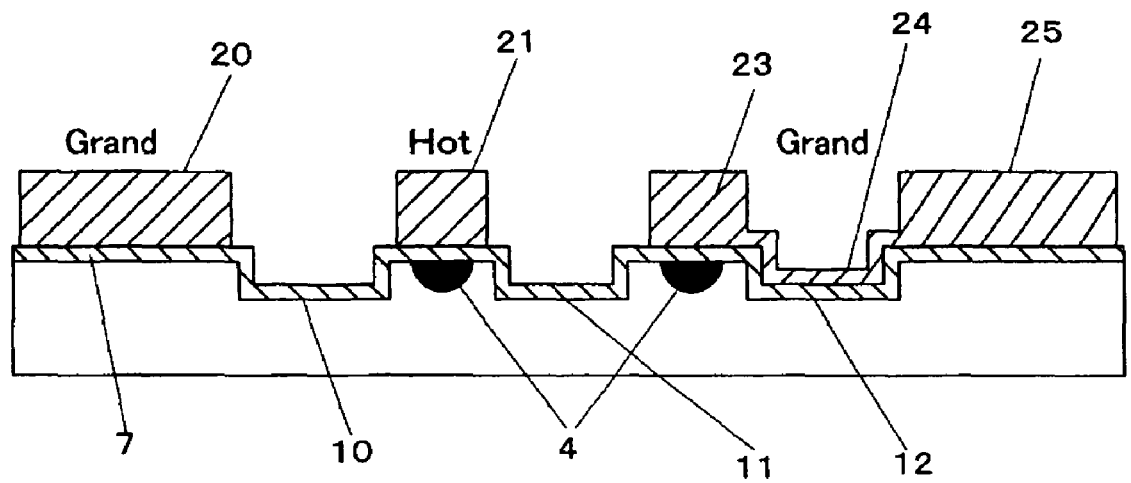
FIG. 3 is a cross-section view of an optical modulator showing the first embodiment of the present invention.
Figure 4:
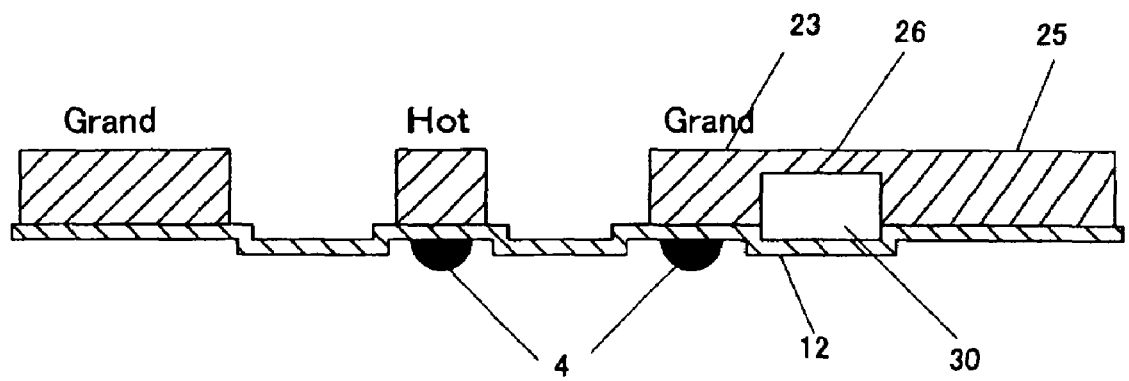
FIG. 4 is a cross-section view of an optical modulator showing the second embodiment of the present invention.
Figure 5:
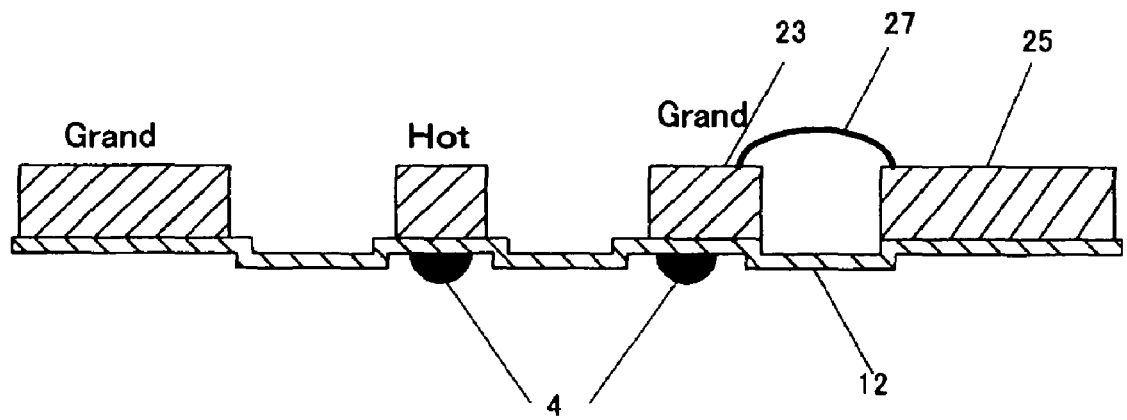
FIG. 5 is a cross-section view of an optical modulator of the third embodiment of the present invention.

FIGS. 3 to 5 are diagrams showing the shape of cross section when the optical modulator of the present invention is cut off along the dashed line A in FIG. 1. FIGS. 4 and 5 show only the shape around the substrate surface.

In addition, FIG. 6(a) is a perspective view of the shape of cross section when the optical modulator of the present invention is cut off along the dashed line A in FIG. 1. FIGS. 6(b), (c) and (d) show the shape of the control electrode formed on the recess when it is seen from above an LN substrate.

The first embodiment of the present invention shown in FIG. 3 is characterized in that, concerning each thickness of electrode sections 23, 24, and 25 which configure one grounding electrode, the grounding electrode section 24 on a recess 12 is configured to be thinner than the grounding electrode sections 23 and 25 on the non-recess, preferably thinner than the depth of the recess 12. This enables remarkable improving of the effect of stress relaxing. The specific thickness of the grounding electrode section 24 on the recess 12 is preferably thinner than 30000 Å, more preferably thinner than 20000 Å. Because the thickness of the grounding electrode section 24 is thereby adequately thin even compared with the thickness of the grounding electrode sections 23 and 25 on the non-recess (a control electrode used for an average optical modulator is about 20 μm in thickness), or with about 10 μm of the depth of a groove of a ridge part, it becomes possible to prevent the stress generated in the grounding electrode section 24 on the recess and the grounding electrode sections 23 and 25 from concentrating into the side of the recess 12.

Also, by configuring the control electrode section 24 on the recess thicker than 100 Å, preferably thicker than 500 Å, it is possible to produce an optical modulator stably without any problem such as disconnection of the grounding electrode section in deposition which is applied for the production process of the optical modulator.

A method for masking the grounding electrode section 24 with a photoresist film after the formation of a Ti.Au electrode pattern, and forming the grounding electrode sections 23 and 25 having thickness of several tens of μm according to a gold plating method or the like, a method for preventing the grounding electrode section 24 from being plated in process of the gold plating after the formation of the electrode pattern, and subsequently forming the grounding electrode sections 23 and 25 up to the necessary thickness, and further, a method for protecting the grounding electrode sections 23 and 25 with the photoresist film or the like after the gold plating, and etching the grounding electrode section 24 up to the necessary depth, are cited as methods for producing the grounding electrode sections 23, 24 and 25 shown in FIG. 3.

The second embodiment of the present invention shown in FIG. 4 is characterized in that a space 30 is created between the recess 12 and a grounding electrode section 26. Because this keeps the control electrode away from the recess 12, the stress generated in the grounding electrode sections 23, 25 and 26 is prevented from being put on the side of the recess 12.

A method for forming a liftoff layer on the recess 12 before the formation of the electrode pattern, and subsequently performing formation of the electrode pattern and a gold plating treatment etc. and then, removing the liftoff layer is cited as a method for producing the above grounding electrode section shown in FIG. 4.

The third embodiment of the present invention shown in FIG. 5 is characterized in that the grounding electrode sections 23 and 25 are connected with each other using a conducting wire 27 in the shape of a thin line such as ribbon or wire. By this, there is no grounding electrode which contacts directly with the recess 12. Therefore, the side of the recess 12 is not affected by the stress generated in the grounding electrode. Further, the thin line has the flexibility. Therefore, it has beneficial effects such that it does not allow the stress generated in the grounding electrode sections 23 and 25 transmitting to each other, and also, the thin line 27 is not broken because of metal fatigue or the like even when the stress is repeatedly generated.

A method for forming the grounding electrode sections 23 and 25 according to the electrode pattern formation and the gold plating treatment, and subsequently connecting the thin line 7 to each of grounding electrode sections 23 and 25 using wire bonding or the like is cited as a method for producing the grounding electrode sections 23, 25 and 27 shown in FIG. 5.

Figure 6:
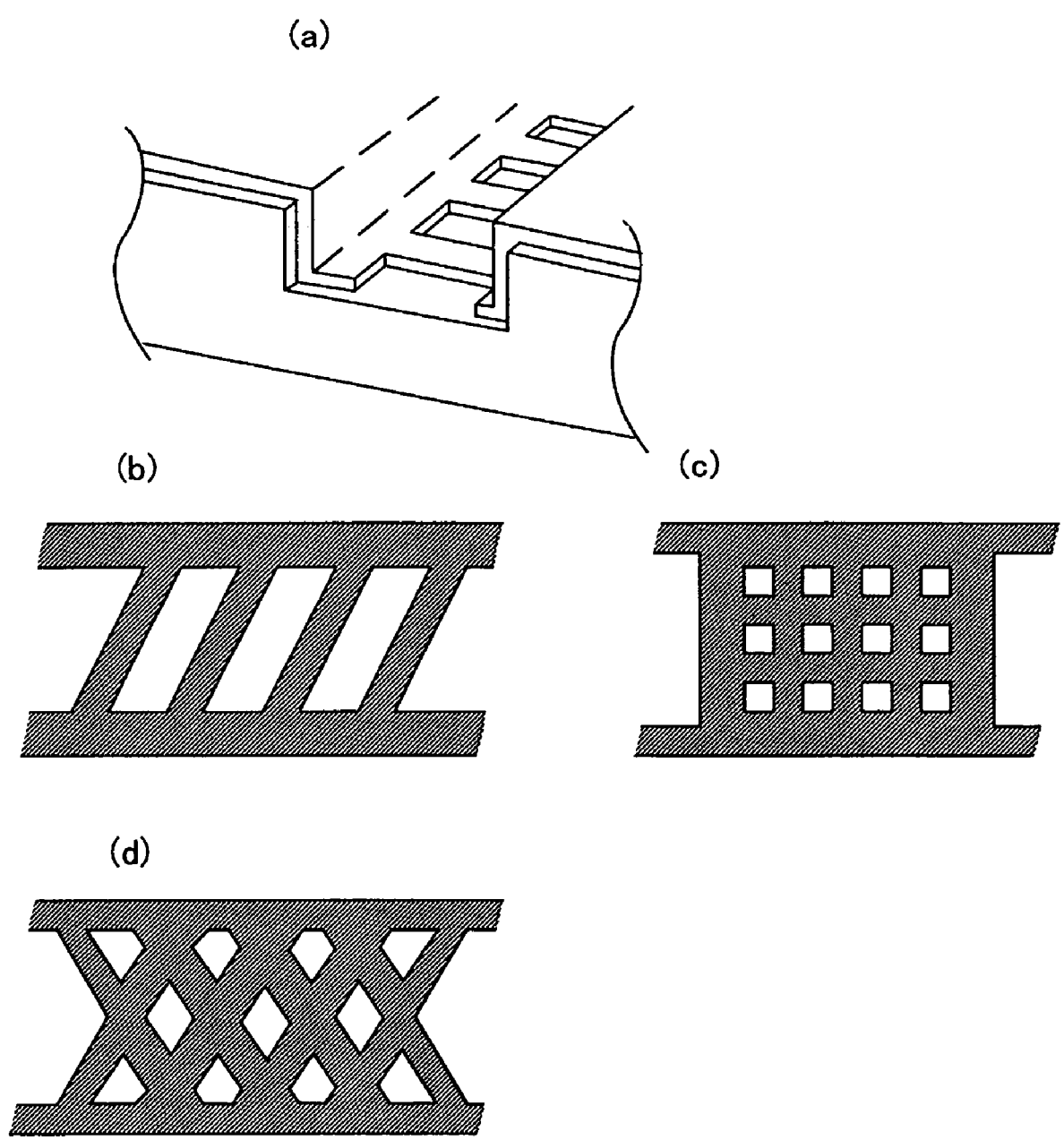
FIG. 6 is a cross-section view of an optical modulator of the fourth embodiment of the present invention.

The fourth embodiment of the present invention shown in FIG. 6 is characterized in that the control electrode on the recess is in the shape of a stripe or a lattice. In FIG. 6(a), stripes are formed in a direction perpendicular to a long side of the recess. In FIG. 6(b), stripes are inclined to the long side of the recess. In FIG. 6(c), the control electrode on the recess is in the shape of a lattice. In FIG. 6(d), lattice is inclined to the long side.

By configuring such stripe shape or lattice shape, thermal expansion of the control electrode can be absorbed by spaces formed by the stripe shape or lattice shape, and the stress on the side of the recess can be decreased. In addition, because the part in the shape of a stripe or lattice has weaker mechanical strength than the other parts of the control electrode, the stress-strain generated in the control electrodes as a whole can be absorbed by the mechanical deformation of the control electrode on the recess. Then, transmission of the stress from the control electrodes to the surface of the substrate is relaxed.

In particular, by inclining the stripe shape as in FIG. 6(b), normal stress on the side of the recess can be relaxed.

In addition, although FIG. 6 show straight-line shape, it is also possible to form the control electrode with curved lines such as wavy lines. Further, intervals between stripes or lattices are not limited to regular intervals, but can be changed such that, for example, the intervals get dense where the control electrode needs low resistivity, and the intervals get sparse where the control electrode needs high resistivity.

By examining the relationship between the percentage of voids of the control electrode formed on the recess and the frequency characteristic of an optical modulator, a result shown in Table 1 was obtained.

An optical waveguide was formed by Ti thermal diffusion on an LN substrate with Z cut, and subsequently 0.5 μm of a buffer layer of $SiO_2$ was formed on the surface of the substrate.

Figure 2:
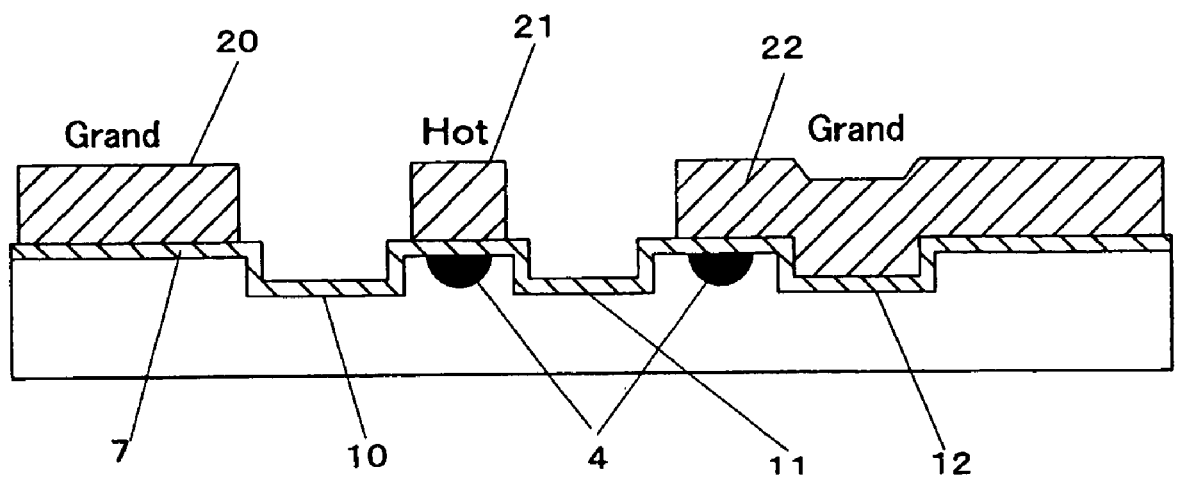
FIG. 2 is a cross-section view of an existing optical modulator.

Next, dry etching formed a recess of 5 μm in depth and 20 μm in width. As the control electrode, after forming a Ti layer and an Au layer as a foundation layer by an evaporation method, the Au layer was formed into an electrode of 20 μm in thickness by a plating method as an electrode layer. The cross-section view of the optical modulator formed as described above is in the shape shown in FIG. 2.

In order to examine the fluctuation of the percentage of voids of the control electrode, the interval or length of stripe shape shown in FIG. 6(a) was changed to the percentage of voids 0-100% as in Table 1.

For the frequency characteristic of the optical modulator, the temperature characteristic of a bias point and a transmission frequency response were measured. In a test of the temperature characteristic of a bias point, the DC bias change (drift) amount of the optical modulator was measured in a temperature environment varying from 0° C. up to 70° C. For an evaluation method, ○ means the drift amount less than 2 V, Δ means the drift amount from 2 V to 5 V, and X means the drift amount over 5 V.

In addition, in a test of the transmission frequency response, optical output from the optical modulator was measured by an optical output detecting element and thereby the generation status of a ripple was checked. For an evaluation method, ○ means that hardly any ripple was generated, Δ means that a small ripple was generated, and X means that a big ripple was generated.

TABLE 1

The relationship between the percentage of voids of the control electrode on the recess and the frequency characteristic

| Percentage of voids (%) | 0 | 10 | 25 | 50 | 75 | 90 | 100 |
|---|---|---|---|---|---|---|---|
| Temperature characteristic | X | Δ | ○ | ○ | ○ | ○ | ○ |
| Transmission characteristic | ○ | ○ | ○ | ○ | ○ | Δ | X |

From the result shown in Table 1, the temperature characteristic of a bias point or the transmission frequency response is favorable when the percentage of voids is from 10 to 90%. Especially when the percentage of voids is from 25 to 75%, more favorable characteristics can be realized.

In addition, the above-described embodiment 4 explained in FIG. 6 can inhibit the stress on the side of the recess more effectively by combining with the embodiment 1 or 2.

Here, the embodiments of the present invention were explained. However, the present invention is not limited to the scope of the above embodiments, but the above technical configuration can be replaced by a well-known stress relaxing means in the art in order to prevent the stress generated in the control electrode of the optical modulator from affecting the substrate, especially to remove the stress concentrating in the side of the recess of the substrate.

Moreover, although the present invention was explained exemplifying the MZI type LN optical modulator using the Z cut substrate, it is obviously possible to apply the present invention to an optical modulator using other substrate materials that have an electrooptic effect, and an optical modulator comprising an optical waveguide in other shapes.

Further, as an application of the present invention in addition to the above-described configuration, it is also obviously possible to add extra components according to the well known technology if required for the purpose of improving various characteristics of the optical modulator, for example, to remove a part of the reverse side of the substrate for preventing concentration of the electric field into the optical waveguide or leakage of a microwave to the outside of the substrate.

As explained above, in accordance with the optical modulator of the present invention, it becomes possible to relax the stress generated between the substrate and the control electrode due to a temperature change in the optical modulator, in particular, the stress working intensively on the recess formed in the surface of the substrate, and to prevent deterioration of optical modulator control caused by the stress-strain in the substrate comprising the optical waveguide.

As a result, it becomes possible to provide the optical modulator in which stabilized driving is realized over a long time.

The invention claimed is:

1. An optical modulator comprising
a substrate consisting of a material having an electrooptic effect,
an optical waveguide provided in said substrate,
a control electrode for controlling a phase of light being guided through said optical waveguide, and
a recess in a surface of said substrate, said control electrode being formed on said recess, wherein said control electrode is disposed continuously on said recess and adjacent non-recess portions of said surface of said substrate at both sides of said recess,
the control electrode formed on said recess is provided with a stress relaxing means, and
said stress relaxing means comprises configuration of a thickness of said control electrode on the recess as thinner than a depth of the recess.

2. The optical modulator as claimed in claim 1, wherein a thickness of said control electrode on the recess is 30000 to 500 Å.

3. The optical modulator as claimed in claim 1, wherein said stress relaxing means comprises formation of said control electrode on the recess in a shape of a stripe or of a lattice.

4. The optical modulator as claimed in claim 1, wherein said substrate comprises a direction of a crystal axis capable of changing a refractive index in a direction vertical to the substrate surface by electrooptic effect.

5. The optical modulator as claimed in claim 1, wherein said control electrode provided with said stress relaxing means is a grounding electrode.

6. The optical modulator as claimed in claim 1, wherein said stress relaxing means configures a percentage of voids of said control electrode on the recess in a range of 10 to 90 percent.

7. The optical modulator as claimed in claim 1, wherein said stress relaxing means comprises configuration of a thickness of said control electrode on the recess as thinner than a thickness of said control electrode on said non-recess portions of said surface of said substrate.

8. The optical modulator as claimed in claim 7, wherein said stress relaxing means configures a percentage of voids of said control electrode on the recess in a range of 10 to 90 percent.

9. An optical modulator comprising
a substrate consisting of a material having an electrooptic effect,
an optical waveguide provided in said substrate,
a control electrode for controlling a phase of light being guided through said optical waveguide, and
a recess in a surface of said substrate, said control electrode being formed on said recess,
wherein said control electrode is disposed continuously on said recess and adjacent non-recess portions of said surface of said substrate at both sides of said recess,
the control electrode formed on said recess is provided with a stress relaxing means, and said stress relaxing means comprises configuration of a thickness of said control electrode on the recess as thinner than a thickness of said control electrode on said non-recess portions of said surface of said substrate.

10. The optical modulator as claimed in claim 9, wherein a thickness of said control electrode on the recess is 30000 to 500 Å.

11. The optical modulator as claimed in claim 9, wherein said stress relaxing means comprises formation of said control electrode on the recess in a shape of a stripe or of a lattice.

12. The optical modulator as claimed in claim 9, wherein said substrate comprises a direction of a crystal axis capable of changing a refractive index in a direction vertical to the substrate surface by electrooptic effect.

13. The optical modulator as claimed in claim 9, wherein said control electrode provided with said stress relaxing means is a grounding electrode.

14. An optical modulator comprising
a substrate consisting of a material having an electrooptic effect,
an optical waveguide provided in said substrate,
a control electrode for controlling a phase of light being guided through said optical waveguide, and
a recess in a surface of said substrate, said control electrode being formed on said recess,
wherein the control electrode formed on said recess is provided with a stress relaxing means, and
said stress relaxing means configures a percentage of voids of said control electrode on the recess in a range of 10 to 90 percent.

15. The optical modulator as claimed in claim 14, wherein a thickness of said control electrode on the recess is 30000 to 500 Å.

16. The optical modulator as claimed in claim 14, wherein said stress relaxing means comprises formation of said control electrode on the recess in a shape of a stripe or of a lattice.

17. The optical modulator as claimed in claim 14, wherein said substrate comprises a direction of a crystal axis capable of changing a refractive index in a direction vertical to the substrate surface by electrooptic effect.

18. The optical modulator as claimed in claim 14, wherein said control electrode provided with said stress relaxing means is a grounding electrode.

19. An optical modulator comprising
a substrate consisting of a material having an electrooptic effect,
an optical waveguide provided in said substrate,
a control electrode for controlling a phase of light being guided through said optical waveguide, and
a recess in a surface of said substrate, said control electrode being formed on said recess,
wherein the control electrode formed on said recess is provided with a stress relaxing means, and
said stress relaxing means comprises configuration of said control electrode on the recess as a thin conducting line for connecting the control electrode formed on said adjacent non-recess portions of said surface of said substrate at both sides of said recess.

20. The optical modulator as claimed in claim 19, wherein said control electrode provided with said stress relaxing means is a grounding electrode.

* * * * *